INVENTOR.
MILTON BIRNBAUM
BY Don Finkelstein
ATTORNEY

Fig. 6

INVENTOR.
MILTON BIRNBAUM

Fig. 8

MILTON BIRNBAUM
INVENTOR.

United States Patent Office 3,434,072
Patented Mar. 18, 1969

3,434,072
CONTINUOUS WAVE LASER ARRANGEMENT
Milton Birnbaum, Palos Verdes Estates, Calif., assignor to The Aerospace Corporation, Los Angeles, Calif., a corporation of California
Filed Mar. 8, 1963, Ser. No. 263,964
U.S. Cl. 331—94.5                                    22 Claims
Int. Cl. H01s 3/00

This invention relates to the laser art and more particularly to an improved arrangement for providing a continuous wave laser beam.

In many applications it is desirable to use a beam of coherent electromagnetic radiation having energy substantially concentrated in a particular preselected wavelength or narrow wavelength bandwidth. One type of device capable of generating such a beam of electromagnetic radiation is generally termed a "laser," which is an acronym for "Light Amplification by the Stimulated Emission of Electromagnetic Radiation." In applications utilizing a laser beam, such as communications, medicine, materials processing, and the like, it is often desirable to have a laser beam with energy in wavelengths in the near and far ultraviolet, the visible or the near and far infrared portions of electromagnetic radiation spectrum. However, the laser structure and methods of operation utilized in the past have generally not been able to provide laser beams over this range of electromagnetic radiation wavelengths.

More particularly, prior laser structures and laser methods of operation have generally permitted utilization of materials that only provided laser beams with energy in the infrared portion of the electromagnetic radiation spectrum. Therefore, these prior laser structures and methods of operation have not been able to provide laser beams having energy in wavelengths in the near and far ultraviolet or visible portions of the electromagnetic radiation spectrum.

Many of the laser arrangements utilized in the past have also been of the "pulsed" type. That is, the laser beam of coherent electromagnetic radiation that was generated therein was only emitted in short pulses rather than in a continuous emission. In many communications, drilling, surgical applications and the like, it is desirable to have a continuously emitting laser structure, and these are usually termed "continuous wave lasers." In addition, the prior types of continuous wave lasers utilized in the past have been extremely limited in the wavelengths in which the laser will emit. These limitations on available laser emission wavelengths associated with the prior continuous wave laser structure and methods of operation have been even more severe than the prior pulse type lasers.

Therefore, in order to obtain a continuous wave laser having a laser emission in a wide range of wavelengths, it is necessary to provide an improved laser structure and an imroved laser operating technique so as to make available for utilization in the laser materials capable of providing continuous laser emission outputs of electromagnetic radiation in the above-described desired wavelengths.

These desiderata are achieved, according to one embodiment of applicant's invention herein, by utilizing a continuous beam of optically orientable particles and selecting, as a laser material, optically orientable medium having in its quantum energy structure certain preselected allowable quantum energy levels and certain preselected time constants associated with the energy transitions between the preselected energy levels. The energy separation between at least two of the preselected allowable quantum energy levels is equivalent to the desired laser wavelength of electromagnetic radiation.

In this embodiment the optically orientable medium is contained in an oven that is adapted to emit the beam of optically orientable particles comprising the optically orientable medium. For example, the oven may contain sodium and emit a beam of sodium atoms, the sodium atoms comprising the optically orientable particles.

The beam of optically orientable particles is split by beam-splitter techniques into a plurality of discrete secondary beams and each of the secondary beams is substantially homogeneous in one allowable ground energy quantum level of the sodium quantum energy structure. The beam splitter utilized in this embodiment comprises a strong, unidirectional, nonuniform magnetic field gradient through which the beam of optically orientable particles passes, together with the associated focusing and collimating arrangements. The unidirectional non-uniform magnetic field splits the beam of optically orientable particles into the plurality of secondary beams and the physical separation of the secondary beams is proportional to the magnetic field gradient, the magnetic dipole strength of the optically orientable particles, and the distance the secondary beams travel after splitting.

Thus, in passing through the strong, magnetic field gradient the beam of optically orientable particles is split into the plurality of the secondary beams and each of the secondary beams is and remains substantially homogeneous in a single energy level particle.

A laser cell is positioned to receive selectively one of the secondary beams. That is, only particles having the energy contained in the particular selected secondary beam are admitted into the laser cell. In this embodiment, the laser cell comprises a tube-like body member defining a passageway therethrough and which is traversed by the selected secondary beam of optically orientable particles. First wall portions of the body member comprise a pair of substantially flat, parallel and oppositely-disposed reflecting surfaces that provide for internal reflection of the desired laser emission wavelength or wavelength bandwidth across the passageway in a direction substantially at right angles to the direction of travel of the selected secondary beam.

The length of the laser cell is selected from considerations of the particular medium selected for utilization in the laser, the time constants associated therewith and the velocity of the individual atoms comprising the selected secondary beam of optically orientable particles.

The particular particle selected for utilization in this embodiment has, in its quantum energy structure, an energy separation or energy separations corresponding to the desired laser emission wavelength.

While the particles comprising the selected secondary beam are in the passageway of the laser cell, they are subjected to an intense trigger light beam of electromagnetic radiation. The trigger light beam has energy in a wavelength corresponding to a preselected energy separation of the particles. The action of the trigger light beam upon the particles induces a sudden energy transition of the particles from the preselected energy level of the selected secondary beam up to a higher energy level. Virtually all the particles subjected to the intense trigger light beam undergo this transformation and this provides an overpopulation condition at the higher energy level with respect to a lower energy level. Thus, a population inversion with respect to the lower energy level is suddenly achieved. Because of this population inversion the particles commence a spontaneous decay from the higher energy level down to the lower energy level and the energy separation between the higher energy level and the lower nergy level corresponds to the desired laser emission wavelengths.

As the particles undergo this spontaneous transition they emit electromagnetic radiation having wavelengths in the desired laser wavelength, corresponding to the energy separation between the higher and the lower energy levels as above described. Some of this radiation is emitted in a direction perpendicular to the pair of reflective wall portions of the laser cell and is reflected back and forth across the passageway therebetween. This stimulates emission of additional electromagnetic radiation at the desired laser wavelength by stimulating the energy transitions from the higher energy level down to the lower energy level of the particles. Thus, a cascade effect is achieved and a high number of particles are substantially simultaneously stimulated to undergo the above-described energy transition by the action of the electromagnetic radiation being reflected between the reflective wall portions. The number of particles thus stimulated is considerably greater than the number of particles in any given period of time that would spontaneously undergo this transition.

One of the pair of reflective wall portions is partially transparent to electromagnetic radiation of the desired laser emission wavelengths and part of this stimulated emission of electromagnetic radiation passes through this partially transparent portion and is emitted to regions external the laser cell and is in a direction substantially perpendicular to the direction of the velocity vector of the beam of optically orientable particles. This emission comprises the laser beam and is a coherent beam of electromagnetic radiation with energy substantially concentrated in the wavelength associated with the energy separation between the higher wavelength to which the trigger light induced transitions of the particles and the lower quantum energy level of the particles to which they decayed. It is substantially free of Doppler broadening because it is at right angles to the beam path.

The secondary beam of particles continually passes through the passageway of the laser cell and thus there is a continuing subjection of optically orientable particles at the energy level of the selected secondary beam to the trigger light beam and the above-described stimulated emission. Thus, the laser beam emitted from the laser cell is continuous. By extracting the laser beam in a direction substantially perpendicular to the direction of the velocity vector of the selected secondary beam not only is Doppler broadening of the emission substantially eliminated but this also allows the utilization of readily available intense trigger light sources for continuous operation.

After undergoing the above-described stimulated energy transition the particles are disaligned from the preselected energy level of the selected secondary beam and leave the laser cell.

In other embodiments of applicant's invention optical pumping may be utilized as the mechanism for achieving a beam of particles having energy substantially homogeneous in a preselected energy level.

These and other embodiments of applicant's invention are more fully described in the following detailed specification taken together with the accompanying drawings, wherein similar reference characters refer to similar elements and in which.

Applicant utilizes in his improved laser a beam of optically orientable particles from which a continuous beam of laser emission is obtained. The optically orientable particles utilized have certain physical characteristics associated with their quantum energy structure and with the allowable transitions between various levels of their quantum energy structure. In order that the operation of applicant's improved laser may be better understood applicant first presents a brief discussion of the fundamental physical concepts associated with an optically orientable medium that may be utilized in applicant's improved laser.

One medium that applicant has found to possess the necessary characteristics for satisfactory operation in applicant's improved continuous wave laser is sodium. Therefore, a brief description of the quantum energy structure of sodium is presented. However, it is to be understood that sodium is only one of many optically orientable mediums that may be utilized in applicant's improved continuous wave laser. The following detailed description of the quantum energy structure of sodium is therefore illustrative of the general quantum energy structure of the class of optically orientable materials that may be utilized in applicant's improved continuous wave laser.

Figure 1A:
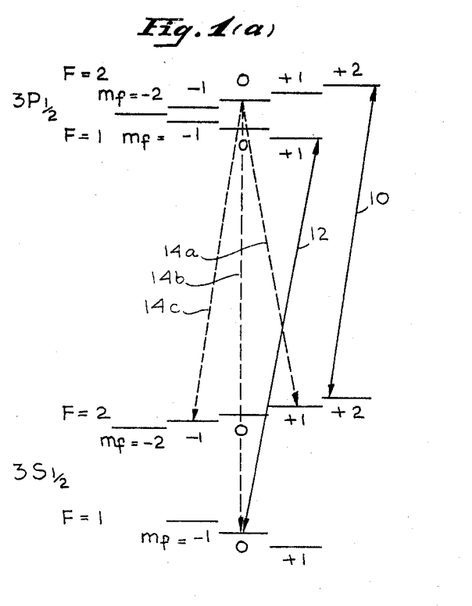
FIGURES 1a, 1b and 1c are diagrammatic representations of a portion of the quantum energy levels of an optically orientable medium useful in applicant's invention herein.

Referring to FIGURE 1a, there is shown a diagrammatic representation of a portion of the allowable quantum energy levels of sodium in a weak, unidirectional magnetic field. Since sodium has a quantum nuclear spin magnetic moment of 3/2 and an orbital electron magnetic moment of 1/2, both the ground state $S_{1/2}$ and the first optically excited state $P_{1/2}$ have two energy levels equivalent to $F=1$ and $F=2$. In a weak magnetic field these two energy levels at each energy state split by Zeeman splitting in to the magnetic substates ($m_t$) shown. These magnetic substates for the $F=1$ levels of the $P_{1/2}$ and $S_{1/2}$ states are $m_t=-1$, 0 and $+1$. For the $F=2$ levels the magnetic substates are $m_t=-2$, $-1$, 0, $+1$ and $+2$. Thus, there are three magnetic substate levels in each $F=1$ level and five magnetic substates levels in each $F=2$ level.

The energy separation between the $F=1$ and $F=2$ levels at the $P_{1/2}$ first optically excited state is quite small and in fact is optically unresolvable. However, the energy separation between the $F=1$ and $F=2$ levels of the $S_{1/2}$ ground state is on the order of 1771.61 mc./sec., and thus transitions from either the $F=1$ or the $F=2$ level of the $S_{1/2}$ ground state to the $P_{1/2}$ first optically excited state basically comprise two wavelengths: one wavelength corresponding to the energy transition between the magnetic substates of the $F=2$ level of the $S_{1/2}$ ground state and either the $F=2$ or $F=1$ levels of the $P_{1/2}$ first optically excited state, and a second wavelength corresponding to the energy transitions between the magnetic substates of the $F=1$ level of the $S_{1/2}$ ground state and either the $F=1$ or $F=2$ levels of the $P_{1/2}$ first optically excited states. These transitions are indicated schematically on FIGURE 1 by the lines 10 and 12.

If a beam of optically orientable paritcles such as a beam of sodium atoms of the $S_{1/2}$ ground energy state and in a weak magnetic field environment is subjected to optical pumping electromagnetic radiation having energy in wavelengths corresponding to the energy separations indicated by the lines 10 and 12 on FIGURE 1a energy is transferred from the optical pumping electromagnetic radiation to the optically orientable particles and the sodium atoms will be "pumped." This process is generally termed "optical pumping." If the optical pumping electromagnetic radiation is unpolarized or is plane polarized then transitions may be made between magnetic substates of any value in the $S_{1/2}$ ground state and the $P_{1/2}$ first optically excited state. If, however, the optical pumping electromagnetic radiation is circularly polarized, then the selection rules apply and in the transition the atoms can only undergo a gain or a loss, depending upon the direction of circular polarization, of one magnetic substate number. The type of transition induced by circularly polarized optical pumping electromagnetic radiation is illustrated by the line 12 on FIGURE 1a and the type of transition induced by plane polarized or unpolarized optical pumping electromagnetic radiation is illustrated on FIGURE 1a by the line 10.

After the atoms are pumped up to the magnetic substate levels of the $P_{1/2}$ first optically excited state they undergo spontaneous decay transitions back down to the $S_{1/2}$ ground energy state. In these spontaneous decay transitions the atoms may undergo a change in magnetic substate number by gaining or losing one, or the magnetic substate number may stay the same. Such transitions are indicated by the dotted lines 14a, b, and c, all of which show transitions from the $m_f=0$, $F=2$ level of the $P_{1/2}$ first optically excited state.

For an equal distribution of atoms in the magnetic substate levels of the $P_{1/2}$ first optically excited state, there are various probabilities for returning down to any particular magnetic substate of the $S_{1/2}$ ground energy state and these probabilities determine the relative strength of the electromagnetic radiation emitted from the atoms during these decay transitions. This electromagnetic radiation emitted will have energy in wavelengths corresponding to the energy separations shown by the lines 10 and 12 with relative intensities depending upon the above-described probabilities.

As a general rule, however, it can be seen that since there are only three magnetic substates in the $F=1$ level of the $S_{1/2}$ ground state and five magnetic substates in the $F=2$ level of the $S_{1/2}$ ground state, then the electromagnetic radiation emitted during the decay transitions having energy in a wavelength equivalent to the separation illustrated by the line 10 will be stronger with a higher intensity than the electromagnetic radiation emitted having energy in a wavelength equivalent to the separation illustrated by the line 12.

It will be appreciated that if circularly polarized optical pumping electromagnetic radiation is utilized, substantially all the particles in the beam will be pumped into the $F=2$, $m_f=+2$ quantum energy condition, thereby substantially depleting and emptying the $F=1$ level. Thus, optical pumping with circularly polarized electromagnetic radiation is one method of achieving a state selection of a beam of optically orientable particles into a preselected quantum energy level.

Figure 1B:
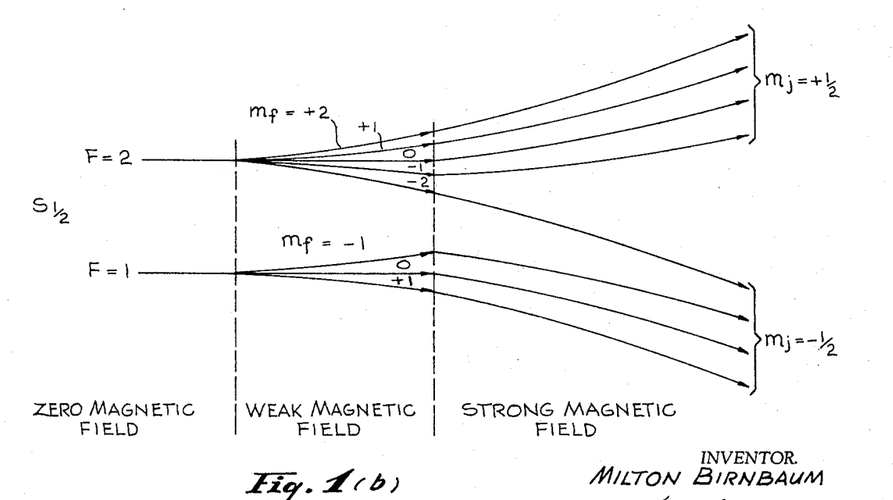

Another technique that may be utilized to achieve state selection in a preselected quantum energy level is by beam splitting techniques. FIGURE 1b illustrates the $S_{1/2}$ ground quantum energy state of a sodium atom in a zero magnetic field, a weak magnetic field and a strong magnetic field environment. In a zero magnetic field environment there are only the $F=2$ and $F=1$ levels. In a weak unidirectional magnetic field environment there are the eight allowable magnetic substates as described above.

If a moving beam of sodium atoms in the $S_{1/2}$ ground state is subjected to a strong, unidirectional, non-uniform magnetic field gradient, the Paschen-Back effect occurs and there is a decoupling of the orbital electron magnetic moment from the nuclear magnetic moment. This results in the generation of two main secondary beams: one having an electron magnetic moment, $m_j$, of $+1/2$ and one having an electron magnetic moment, $m_j$, of $-1/2$. The $m_j=+1/2$ main secondary beam comprises four individual beams: $m_f=+2$, $+1$, $0$ and $-1$ of the $F=2$ level, and the $m_j=-1/2$ main secondary beam comprises four individual beams: $m_f=-2$ of the $F=2$ level, and $m_f=+1$, $0$ and $+1$ of the $F=1$ level.

The physical separation between the two main secondary beams is large in comparison with the separation between the individual beams comprising each main secondary beam. Even though the main secondary beams $m_j=+1/2$ and $m_j=-1/2$ are removed from a magnetic field environment, there will still be the above-described individual beams in each since the direction of the velocity vector in each individual beam is slightly different.

Thus, all the particles in the $m_j=+1/2$ main secondary beam comprise particles in the $F=2$ level of the $S_{1/2}$ ground state thereby providing a state selection in a preselected quantum energy level. Similarly, three-fourths of the particles are in the $F=1$ level and one-fourth in the $F=2$ level.

A beam of particles in a state selected condition, such as the $m_j=+1/2$ main secondary beam in the $F=2$ level, may be induced by optical means to undergo quantum energy transitions to provide a laser output. Such transitions are shown on FIGURE 1c. As shown on FIGURE 1c a beam of particles having energy substantially concentrated in the $F=2$ level and therefore virtually no particles in the $F=1$ level, may be optically pumped by an intense beam of unpolarized or plane polarized electromagnetic radiation having energy in 5890 A., 5896 A. or both wavelengths. The intense 5890 A. wavelength radiation induces a sudden transition of virtually all the particles into the $P_{1/2}$ first optically excited state and the 5896 A. wavelength radiation induces a similar transition into the $P_{3/2}$ second optically excited state.

When a sufficient number of atoms have been pumped from the $S_{1/2}$ ground state up to the $P_{1/2}$ and $P_{3/2}$ optically excited states such that there is an overpopulation thereof with respect to the empty $F=1$ energy level of the $S_{1/2}$ ground state, a population inversion therebetween occurs and, in the proper environment as described below, the atoms in the $P_{1/2}$ and $P_{3/2}$ optically excited states can be induced to make stimulated energy transitions from the energy levels of the $P_{1/2}$ and $P_{3/2}$ optically excited states down to the $F=1$ energy level of the $S_{1/2}$ ground state.

The degree of overpopulation required to allow this stimulated emission to occur is dependant upon the particular optically orientable particle utilized. When this stimulated emission occurs, electromagnetic radiation having energy in wavelengths corresponding to 5890 A. and 5896 A. energy separations will be emitted. This is the laser emission from the optically orientable particles and in the proper environment a coherent beam of electromagnetic radiation having energy in these two wavelengths will be emitted from the optically orientable particles. It will be appreciated that either 5890 A. or 5896 A., or both, radiation may be utilized in the intense trigger light beam, depending on the desired laser emission wavelengths.

In inducing the overpopulation condition at either or both the $P_{1/2}$ first optically excited state and the $P_{3/2}$ second optically excited state, it is necessary that the lifetime of the particles comprising the optically orientable medium at the optically excited states be on the same order of magnitude as the optical pumping time that achieves the population inversion condition. Therefore, preferably an intense beam of unpolarized or plane polarized electromagnetic radiation is utilized to achieve the overpopulation condition so that a rapid transition of the particles from their aligned condition in an energy level of the $S_{1/2}$ ground state up to the optically excited states occurs, and during this establishment of an overpopulation condition, there is very little spontaneous decay.

Optically orientable mediums that may be utilized in applicant's invention herein are thus defined as those mediums capable of transformations into a beam of optically orientable particles having allowable energy levels and preselected energy separations therebetween. Also, transitions between these energy levels may be optically induced by methods similar to that described above in connection with the energy level diagram for sodium shown on FIGURES 1a, 1b and 1c. Additionally, the optically orientable particles must have time constants associated with their transitions and lifetimes at a given allowable energy level as above specified.

In addition to the sodium atom described above for illustrative purposes, applicant has found that many other materials, atoms and molecules may be utilized to provide a beam of optically orientable particles in applicant's invention for providing improved laser operation. Table I below is a listing of some of the materials that may be utilized as optically orientable particles in applicant's invention herein.

TABLE I

*Optically orientable particles*

| Element: | Laser emission wavelengths, (angstroms) |
|---|---|
| Hydrogen | 1215.7 |
| Lithium | 6707 |
| Sodium | 5889 |
| Potassium | 7664 |
| Rubidium | 7800 |
| Cesium | 8521 |
| Magnesium | 4571 |
| Calcium | 6573 |
| Cadmium | 3261 |
| Mercury | 2537 |

The laser emission wavelengths specified in Table I are only the principal lines of the emission from each of the elements specified. As discussed above, there often may be several wavelengths associated with the coherent beam of electromagnetic radiation obtained from the spontaneous emission of electromagnetic radiation in applicant's laser.

When utilizing materials other than the sodium, described above, the same techniques as described may be utilized in the practice of applicant's invention. However, there will be slight variations, apparent to those skilled in the art, because of the different fine and hyperfine structures and different time constants of other optically orientable particles.

The above physical principles are utilized in applicant's invention herein to provide a laser operation in which a continuous beam of coherent electromagnetic radiation containing energy in preselected wavelengths is emitted. The preselected wavelengths correspond to allowable energy transitions for the particular optically orientable particles selected. As shown on Table I, applicant's invention herein allows laser emissions with wavelengths from the far ultraviolet of hydrogen at 1215.7 angstroms through the near ultraviolet, visible and into the infrared portions of electromagnetic spectrum with cesium at 8521 angstroms. However, Table I is not intended to be a complete listing of all materials that may be utilized in applicant's invention herein. Rather, it is an example of the wide range of wavelengths obtainable in a laser emission by the utilization of applicant's improved laser structure and method of operation thereof.

Figures 2, 3, 3A:
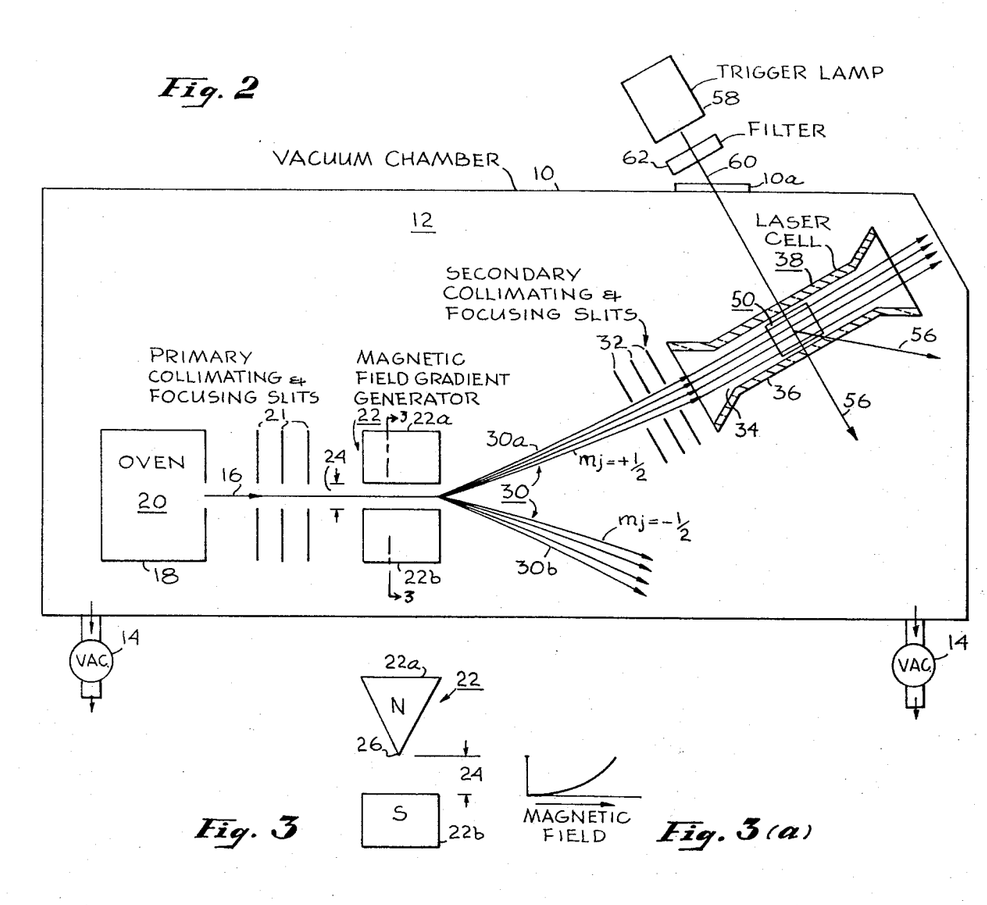
FIGURE 2 is a schematic representation of one embodiment of applicant's invention.
FIGURES 3 and 3a are schematic representations of a strong, unidirectional, non-uniform magnetic field gradient generator.

Referring now to FIGURE 2, there is shown in schematic representation the structure associated with one embodiment of applicant's invention. As shown on FIGURE 2, there is a vacuum chamber 10 having an internal volume 12 in which a preselected low pressure is maintained by a pair of vacuum pumps 14. A beam of optically orientable particles 16 is generated in the interior 12 of the vacuum chamber 10 from a source of optically orientable particles such as the oven 18. The oven 18 may be of any well-known design, such as an induction heated oven or any other source for generating the beam of optically orientable particles 16. Maintained within the oven 18 is a supply of optically orientable medium 20 which, for example, may be sodium. When the oven 18 is energized the sodium 20 is evaporated therein and, because of the low pressure maintained within the vacuum chamber 10, a beam of optically orientable particles 16 is emitted therefrom and, in this embodiment, the beam of optically orientable particles comprises a beam of sodium atoms in their ground energy state.

The beam of optically orientable particles pass through a series of primary collimating and focusing slits 21 which provide a substantially linear beam at the exit therefrom. This linear beam of optically orientable particles is directed through a strong, unidirectional, non-uniform magnetic field gradient generator 22 which, for example, may comprise a north pole 22a and a south pole 22b of a permanent magnet. Any other type of magnetic field gradient generator may also be utilized in applicant's invention, such as an electromagnet. The magnetic field gradient generator 22 provides a strong, unidirectional non-uniform magnetic field between the pole pieces 22a and 22b through which the linear beam of optically orientable particles 16 passes.

FIGURE 3 illustrates one form of the pole pieces 22a and 22b that may be utilized to provide the unidirectional non-uniform magnetic field gradient. As shown on FIGURE 3, which is a section through the magnetic field gradient generator 22 taken along the line 3—3 thereof, the pole piece 22a is substantially wedge-shaped and the pole piece 22b is substantially rectangular. The magnetic field gradient induced by the opposite polarity pole pieces 22a and 22b across the gap 24 therebetween is illustrated in the corresponding graph of FIGURE 3a. As shown thereon, the magnetic field strength is greatest in a plane corresponding to the point 26 of the wedge-shaped pole piece 22a and decreases in strength down to the upper surface of pole piece 22b.

This strong, unidirectional, non-uniform magnetic field gradient in the gap 24 between the pole pieces 22a and 22b of magnetic field gradient generator 22 exerts a differential force upon the optically orientable particles in the beam of optically orientable particles 16 depending upon their magnetic dipole strength. For example, with the optically orientable particle beam 16 comprising a beam of sodium atoms in the $S_{1/2}$ ground state, each of the magnetic substates of the $F=1$ and the $F=2$ level will be acted upon by a different force in passing between the pole pieces 22a and 22b. Further, the strong, unidirectional, non-uniform magnetic field also induces splitting of the beam of optically orientable particles 16 into the degenerate magnetic substates of the $F=1$ and $F=2$ levels of the $S_{1/2}$ ground state. Since each of the magnetic substates has a different dipole strength, the force exerted on particles in each of the individual magnetic substates will be different and consequently, as described above, two main secondary beams 30, as shown on FIGURE 2, result from the passing of the beam of optically orientable particles through the gap 24 in the magnetic field gradient generator 22.

The particles comprising the main secondary beam 30a, for example, are all of the same energy level and comprise only particles in the $F=2$ level of the $S_{1/2}$ ground state of sodium. The other secondary beam, 30b, similarly comprises 75% of particles having energy in the $F=1$ level and 25% in the $F=2$ level of the $S_{1/2}$ ground state. For descriptive purposes, applicant will describe the operation of the embodiment of his invention shown on FIGURE 2 as utilizing the secondary beam 30a from which pulsed laser emission is emitted.

The secondary beam 30a passes through secondary collimating and focusing slits 32 which provide a substantially linear unidirectional secondary beam of optically orientable particles eliminating velocity dispersions that might occur in the secondary beam 30a. However, the secondary collimating and focusing slits 32 may be omitted when the secondary beam 30a is of a sufficiently narrow and unidirectional character such that further collimating and focusing is not required.

The actual physical separation of the secondary collimating and focusing slits 32 from the magnetic field gradient generator 22 is selected from considerations of the particular type of optically orientable medium 20, that has been selected, in order that a proper separation between the secondary beams 30 may be obtained so that only the particular preselected secondary beam, such as the secondary beam 30a, passes through the secondary collimating and focusing slits 32.

It will be appreciated that after leaving the magnetic field gradient generator 22 each of the secondary beams 30 travels in a substantially straight line since there are no forces acting on the secondary beams 30 to induce curvature in their trajectory path. However, while passing through the gap 24 between the pole pieces 22a and 22b of magnetic field gradient generator 22, the paths will be curved because of the varying forces acting upon the particles comprising the beam of optically orientable particels 16. Thus, separation actually begins as soon as the beam of optically orientable particles 16 enters the gap 24 and the pole pieces 22a and 22b are made sufficiently long so that the desired physical separation and velocity direction vector of the individual secondary beams 30 is obtained when they leave the magnetic field gradient generator 22.

After passing the secondary collimating and focusing slits 32, the secondary beam 30a enters a passageway 34 in a tube-like member 36 of a laser cell 38. The selected secondary beam 30a passes completely through the passageway 34 of laser cell 38 and is evacuated from the interior 12 of chamber 10 by vacuum pumps 14. A preselected pressure is maintained within the passageway 34 of the laser cell 38 by the vacuum pumps 14.

Figure 4:
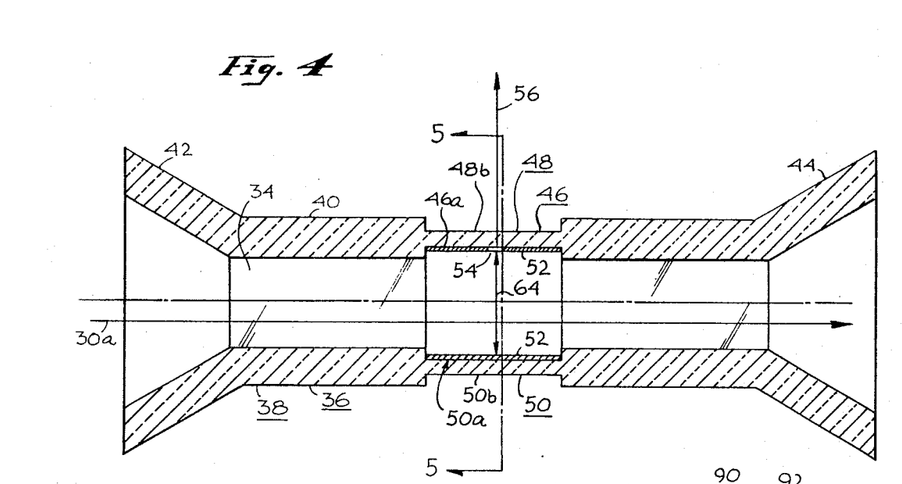
FIGURE 4 is a sectional view through a laser cell.
Figure 5:
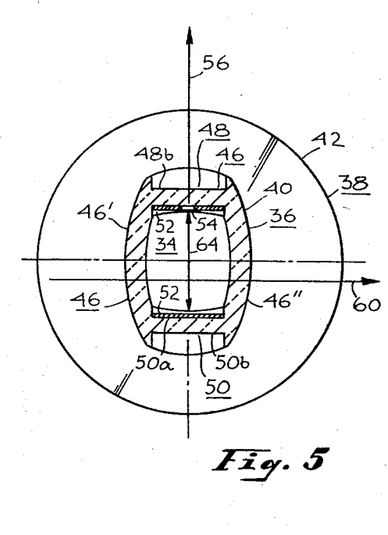
FIGURE 5 is a sectional view of the laser cell illustrated on FIGURE 4 along the line 5—5 thereof.

FIGURES 4 and 5 illustrate sectional views of a preferred form of laser cell 38 that may be utilized in the embodiments of applicant's invention herein. As shown on FIGURES 4 and 5, the laser cell 38 comprises a tubular body member 36 that, in the preferred embodiment of applicant's invention, has wall portions transparent to preselected wavelengths of electromagnetic radiation. Thus, for example, the body member 36 may be fabricated from a tube of quartz, glass or similar such material. An entrance section 42 and a discharge section 44 are coupled to the body member 36 and similarly these walls in the preferred embodiment of applicant's invention are transparent to preselected wavelengths of electromagnetic radiation. A center section 46 of tubular member 36 is elliptical in cross-section and has preselected portions on the major axis thereof of its internal and external surfaces ground flat. This provides a pair of flat, substantially constant thickness, parallel wall portions 48 and 50. The thickness of wall portions 48 and 50 of center section 46 are preferably constant so as to avoid spherical aberrations or other distortions in electromagnetic radiation passing therethrough. Thus, the internal surfaces 48a and 50a and external surfaces 48b and 50b of the parallel wall portions 48 and 50, respectively, lie in substantially parallel planes.

The physical separation between the internal surface 48a of wall 48 and the internal surface 50a of wall 50 is selected from a consideration of the desired wavelength of electromagnetic radiation that is to be contained in the laser beam. Generally, this physical separation will be determined by the gain required to sustain optical oscillations. Wall portions 48 and 50 have surfaces that are reflective of electromagnetic radiation, at least of electromagnetic radiation having a wavelength equivalent to the desired laser emission wavelength. In the preferred embodiment of applicant's invention, as shown on FIGURES 4 and 5, the internal surfaces 48a and 50a of walls 48 and 50, respectively, are coated with reflecting material 52 to reflect electromagnetic radiation back and forth across the passageway 34 in the center section 46, of laser cell 38. By providing the internal surfaces 48a and 50a with the reflective coating, absorption in the wall portions 48 and 50 with each reflection back and forth across the passageway 34 is avoided. The wall sections 48 and 50 are transparent to at least that electromagnetic radiation having a wavelength equivalent to the desired laser emission wavelength.

The coating 52 may be any desired reflective coating and may be selected depending upon the particular wavelength desired in the laser emission. Thus, for example, the coating 50 may be a deposited layer of gold, silver, aluminum, rhodium, and the like, selected to give the highest possible reflectivity in a desired laser emission wavelength or wavelengths, or the coating 52 may be a multiple laser dielectric film coating.

One of the reflective surfaces is slightly transparent to the desired laser emission wavelength of electromagnetic radiation, and this slight transparency may be provided by either a small area 54 that is not coated with reflective material 52 and thus is transparent to the preselected wavelength of electromagnetic radiation desired in the laser emission, or an area on either surface 48a or surface 50a may be left only partially reflecting and partially transparent to the preselected wavelength of electromagnetic radiation.

The non-reflective area 50 shown on FIGURES 4 and 5 allows electromagnetic radiation to leave the passageway 34 through the wall portion 48 as illustrated by the arrow 56. As more fully described below, electromagnetic radiation illustrated by the arrow 56 comprises the laser emission. The laser emission illustrated by the arrow 56 is thus at substantially right angles to the direction of travel of the selected secondary beam 30a through the passage 34 in laser cell 38. As more fully described below, this reduces the Doppler broadening in the laser emission and decreases the intensity requirement of the trigger light.

The laser cell 38 shown on FIGURES 4 and 5 is preferably elliptical in cross-section so as to minimize the path length through the beam of particles 30a in laser cell 38 by the trigger light electromagnetic radiation. Thus, it is desirable that the trigger light electromagnetic radiation traverse the laser cell 38 in a direction parallel to the wall portions 48 and 50 and perpendicular to the direction of travel of secondary beam 30a. The laser emission 56 is then orthogonal to both these directions.

It will be appreciated that many variations of the laser cell 38 may be utilized in applicant's invention. For example, the wall portions 48 and 50 may be left uncoated and unreflective, that is transparent to wavelengths of electromagnetic radiation, and the reflecting surfaces may be placed external to the laser cell 38 and parallel to the wall portions 48 and 50 to provide the reflection back and forth across the passageway 34. Similarly, the laser cell 38 could be rectangular in cross-section.

Referring back now to FIGURE 2, the selected secondary beam 30a enters the passageway 34 through entrance section 42 and traverses the length of the laser cell 38 through passageway 34 and exits through discharge section 44. To minimize the variation from the preselected $F=2$ quantum energy level in the selected secondary beam 30a, applicant has found it advantageous to coat the internal wall surfaces of the laser cell 38 with certain surface coatings (not shown) that minimize the disalignment due to collision of the optically orientable particles with the wall portions of the laser cell 38. Such a coating may comprise eicosane Dri-Film manufactured by General Electric Company, or paraffin. However, it is necssary that at least a portion thereof be transparent to preselected wavelengths of electromagnetic radiation. Utilization of wall coatings have been found to improve the operation of the applicant's laser. However, satisfactory operation may be obtained without utilizing any wall coatings in the laser cell 38.

The secondary beam 30a is continually directed into the laser cell 38 and after the pressure in the laser cell 38 achieves a preselected value as described above, the particles discharged from the laser cell 38 through discharge portion 44 are evacuated from the interior portion 12 of chamber 10 by vacuum pumps 14 along with the optically orientable particles in the secondary beam 30b not utilized in the laser cell 38. As pointed out above, this is a continuous process and hence optically orientable particles are continually being removed from the interior 12 of the chamber 10.

A trigger lamp 58 is positioned external the chamber 10 and is adapted to emit an intense beam of trigger light electromagnetic radiation 60 having energy in a preselected wavelength of electromagnetic radiation. As illustrated on FIGURE 2 when the selected secondary beam 30a comprises optically orientable sodium atoms in the $F=2$ level of the $S_{1/2}$ ground state, the trigger light electromagnetic radiation 60 must contain energy in the wavelength corresponding to the energy separation between the $F=2$ level of the $S_{1/2}$ ground state and either or both the $P_{1/2}$ and $P_{3/2}$ optically excited states as illustrated on FIGURE 1c.

Further, applicant has found that the trigger light electromagnetic radiation 60 is preferably intense to provide a sudden energy transition of virtually all the particles contained within at least the center portion 46 of the laser cell 38. This energy transition induced by trigger light 60 is between the $F=2$ level of the $S_{1/2}$ ground state and for 5890 A. radiation, for example, the $P_{1/2}$ first optically excited state and preferably occurs in a comparatively short time interval depending upon the particular particles and geometry selected for utilization in the laser, as more fully discussed below.

A filter 62 may be positioned between the trigger lamp 58 and the laser cell 38 to remove the wavelengths of electromagnetic radiation other than the desired wavelength or wavelengths of electromagnetic radiation described above.

It will be appreciated that when materials other than sodium are utilized as the optically orientable medium 20 in the oven 18, the particular designations of the energy levels, wavelengths, and the transitions therebetween may be different for each material selected. However, those skilled in the art may easily determine the particular pre-selected wavelength of electromagnetic radiation required in the trigger light beam 60 for any given optically orientable particle. However, when sodium is utilized as the optically orientable medium 20, applicant has found that the trigger lamp 58 may comprise an intense sodium vapor lamp emitting the intense beam of trigger light electromagnetic radiation 60 containing energy in the wavelengths indicated on FIGURE 1c.

As the trigger light electromagnetic radiation 60 irradiates the optically orientable particles contained within the passageway 34 of laser cell 38, energy is transferred from the trigger light 60 to the optically orientable particles and induces the particles to undergo an energy transition up to the $P_{1/2}$ and $P_{3/2}$ optically excited states. After being pumped, the particles undergo a spontaneous decay back down to the empty $F=1$ energy level of the $S_{1/2}$ ground state.

As the particles undergo the transitions from the $P_{1/2}$ and $P_{3/2}$ optically excited states down to the $F=1$ level of the $S_{1/2}$ ground state, electromagnetic radiation having a wavelength equivalent to 5890 A. and 5896 A. is emitted therefrom. Part of this electromagnetic radiation will be emitted in a direction parallel to the arrow 64 across the laser cell 38 and perpendicular to the wall portions 48 and 50 thereof. Such radiation will be reflected back and forth across the passageway 34 by the reflective coated surface portions 48a and 50a of the wall portions 48 and 50, respectively, and will stimulate further emission of electromagnetic radiation from the optically orientable particles by inducing further energy drop down transitions from the $P_{1/2}$ and $P_{3/2}$ optically excited states to the $F=1$ level of the $S_{1/2}$ ground state. This process builds up as a cascade type of emission and electromagnetic radiation in a coherent beam and containing energy in these wavelengths is emitted from the laser cell 38 through the partially transparent area 54 as illustrated by the arrow 56 and comprises the coherent beam of electromagnetic radiation of the laser emission.

In the embodiment illustrated schematically on FIGURE 2 some of the wall portions of the chamber 10 must be transparent to selected wavelengths of electromagnetic radiation to allow the trigger light beam 60 and the laser beam 56 to pass therethrough, as shown by the sections 10a.

With the arrangement illustrated schematically on FIGURE 2, the individual optically orientable particles comprising the secondary beam 30a are acted upon by the trigger light electromagnetic radiation 60 at least when they enter the center portion 46 of laser cell 38 and the above-described energy transitions producing the laser beam 56 occur. Depending upon the time constants of the individual optically orientable particle, the velocity of the secondary beam through the center portion 46, the length of the reflective surface coating 52, and the intensity of the trigger light electromagnetic radiation 60, an individual optically orientable particle may undergo several of the above-described energy transition cycles before entering the discharge section 44 of laser cell 38. This can provide a more intense laser emission beam 56 due to the plurality of energy transition cycles occurring.

Since the secondary beam 30a of optically orientable particles is continually flowing through passageway 34 and the trigger light electromagnetic radiation 60 continually irradiates the secondary beam 60 in passageway 38, the laser emission 60 is continually emitted. Thus, there is no requirement for cyclically operating the structure of applicant's invention herein.

From the above it can be seen that the trigger light electromagnetic radiation 60 contains energy in the same wavelengths that is contained in the laser beam 56. More specifically, the trigger light electromagnetic radiation 60 and the laser beam 56 comprise energy in the wavelengths corresponding to those shown on FIGURE 1c when sodium is utilized as the optically orientable medium 20.

Since it is desired in laser operations to obtain an intense laser emission of electromagnetic radiation, from the above description of the embodiment of applicant's invention illustrated on FIGURE 2, it can be seen that it is desired that all the particles entering the center portion 46 of laser cell 30 be initially at the same preselected energy level. For the particular embodiment shown on FIGURE 2 wherein sodium was utilized as the optically orientable medium 20 and the $F=2$ level of the $S_{1/2}$ ground state was selected in the secondary beam 30a it is advantageous that all the particles commencing passage through center portion 46 be in the $F=2$ level. This provides the high degree of population inversion with respect to the $F=1$ level required after the energy transitions induced by the trigger light electromagnetic radiations 60 up to the $P_{1/2}$ and $P_{3/2}$ excited states take place. That is, there are few if any particles in the $F=1$ level of the $S_{1/2}$ ground state.

As described above, in the preferred embodiments of applicant's invention, it is desired to utilize in the laser cell 38 optically orientable particles in a single magnetic substate since an overpopulation condition can thus be virtually assured. Applicant has found that as the selected secondary beam 30a passes through the passageway 34 of the laser cell 38, collisions occur which tend to disorient the optically orientable particles from the $F=2$ level and into the $F=1$ level. In order to prevent this disorientation, applicant has provided the embodiment shown on FIGURE 6.

Figure 6:
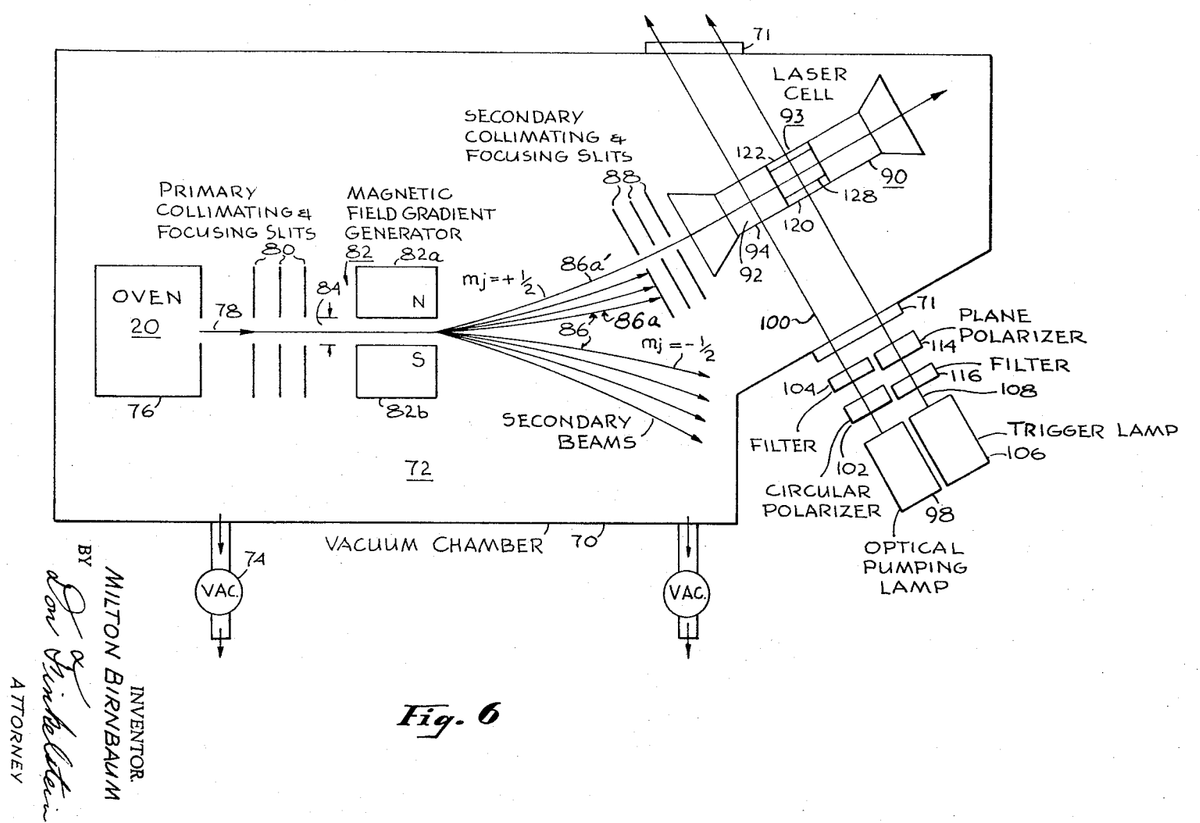
FIGURE 6 is a schematic representation of another embodiment of applicant's invention.

As shown on FIGURE 6, there is a vacuum chamber 70 similar to the chamber 10 of FIGURE 2, having an interior 72 in which a preselected pressure is maintained by vacuum pumps 74 similar to the vacuum pumps 14 shown on FIGURE 2.

A source of optically orientable particles such as the oven 76 is contained within the chamber 70 and contains therein an optically orientable medium 20 which again, for descriptive purposes, may be sodium, and generates a beam of optically orientable particles 78. The beam of optically orientable particles 78 is directed through primary collimating and focusing slits 80 similar to the primary collimating and focusing slits 21 of FIGURE 2, and then pass through a strong magnetic field gradient generator 82 having pole pieces 82a and 82b which may be similar to the magnetic field gradient generator 22 and the pole pieces 22a and 22b illustrated in FIGURES 2 and 3.

As the beam of optically orientable particles 78, which in the embodiment illustrated on FIGURE 6 comprises sodium atoms in the $S_{1/2}$ ground energy state, passes through the gap 84 between the pole pieces 82a and 82b of the magnetic field gradient generator 82, the strong, unidirectional, non-uniform magnetic field generated therein acts upon the beam of optically orientable particles 78 to induce splitting therein. This results in a plurality of secondary beams 86. For purposes of illustration the individual beam 86a' of the main secondary beam 86a is selected for utilization in the embodiment illustrated on FIGURE 6 and this selected beam 86a' is substantially homogeneous in the $m_f=+2$ magnetic substate of the $F=2$ level of the $S_{1/2}$ ground state of sodium. The other portions of secondary beams 86 are evacuated from the interior 72 of chamber 70 through the vacuum pumps 74.

The selected secondary beam 86a' passes through secondary collimating focusing slits 88 which may be similar to the secondary collimating and focusing slits 32 of the embodiment shown on FIGURE 2, and then enters a laser cell 90 in a passageway 92 of an entrance portion 94. The laser cell 90 is illustrated on FIGURE 7.

To prevent disorientation from the magnetic substate $m_f=+2$ of the selected secondary beam 86a, applicant provides an optical pumping lamp 98 adapted to generate a beam of optical pumping electromagnetic radiation 100. In the embodiment shown on FIGURE 6, the optical pumping lamp 98 is positioned in regions external to the chamber 70, though if desired it may also be included within the chamber 70 in the interior 72 thereof.

The optical pumping electromagnetic radiation is provided to insure orientation of the optically orientable particles in the $m_f=+2$ magnetic substate of the $F=2$ level of the $S_{1/2}$ ground state. To achieve this, the optical pumping light electromagnetic radiation 100 is circularly polarized by circular polarizer 102 and, if desired, may be filtered by filter 104 before irradiating the optically orientable particles.

As shown on FIGURE 6, the optical pumping electromagnetic radiation 100 irradiates the secondary beam 86a in the passageway 92. This optical pumping electromagnetic radiation 100 may be left on continually. The optical pumping electromagnetic radiation 100 must contain energy in certain preselected wavelengths. For the sodium atoms utilized in FIGURE 6 as the optically orientable medium 20, this energy must be in wavelengths corresponding to the energy separations indicated by the line 12 on FIGURE 1a, if it is determined that there may be disoriented particles in the $F=1$ level of the $S_{1/2}$ ground state.

Since the optical pumping light electromagnetic radiation 100 is circularly polarized, it induces energy transitions between the $F=1$ level of the $S_{1/2}$ ground energy state up to the $P_{1/2}$ first optically excited state and in these transitions there can only be a gain or a loss of one magnetic substate number. Thus, with this irradiation by the circularly polarized optical pumping light beam 100, all particles in the $F=1$ level of the $S_{1/2}$ ground state are eventually pumped into the $m_f=+2$ magnetic substate of the $F=2$ level of the $S_{1/2}$ ground state after spontaneous decays, which is the preselected energy level contained within the selected secondary beam 86a'. Thus, the number of particles disoriented from this magnetic substate $m_f=+2$ are reduced or eliminated entirely providing, in the laser cell 90 a substantially homogeneous grouping of the optically orientable particles in the $m_f=+2$ magnetic substate, and more particularly the $F=2$ level.

A trigger lamp 106 which may be similar to the trigger lamp 58 of the embodiment illustrated on FIGURE 2 and which may comprise a sodium vapor lamp is adapted to emit an intense beam of trigger light electromagnetic radiation 108. If desired, a plane polarizer 114 may be provided intermediate the trigger lamp 106 and the laser cell 90 to provide a plane polarized trigger light electromagnetic radiation beam 108. Also, a filter 116 may be provided to eliminate undesired wavelengths in the trigger light electromagnetic radiation 108.

Figure 1C:
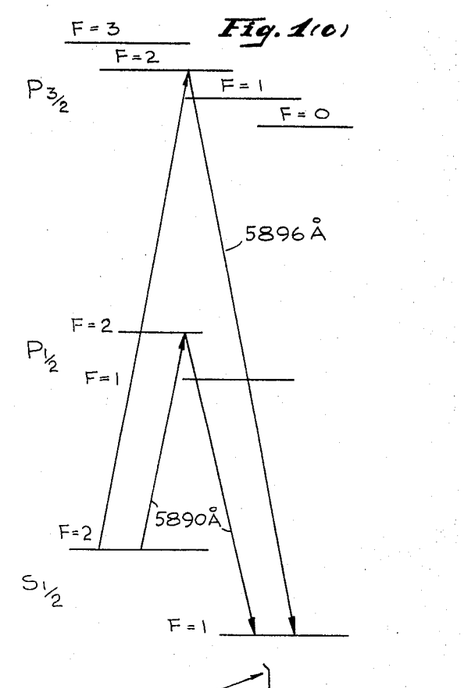

The trigger light electromagnetic radiation 108 must, as described in connection with the operation of applicant's invention illustrated in FIGURE 2, contain energy in a wavelength corresponding to that illustrated on FIGURE 1c. Also, it must be intense so that the optical pumping induced by the trigger light electromagnetic radiation occurs in a substantially short time.

As described above, the trigger light electromagnetic radiation 108 induces quantum energy transitions of the optically orientable sodium atoms in secondary beam 86a' from the $m_f=+2$ magnetic substate of the $F=2$ level of the $S_{1/2}$ ground energy state up to the $P_{1/2}$ and $P_{3/2}$ optically excited states, though either one or the other of these transitions may be provided as desired. This provides a population inversion between the $P_{1/2}$ and $P_{3/2}$ optically excited states and the empty $F=1$ levels of the $S_{1/2}$ ground state and the particles commence a spontaneous decay therebetween. This results in the emission of a laser beam 118 (FIGURE 7) containing energy in wavelengths as indicated in FIGURE 1c. This laser emission is continuous since the beam 86a' continuously traverses the laser cell 90.

Selected portions of the walls defining the chamber 70 must be transparent to preselected wavelengths of electromagnetic radiation in regions that allow the transmission of the optical pumping light beam 100 and the trigger light electromagnetic radiation 108 into the interior 72 thereof, and allow the transmission of the laser beam 118 to regions external the chamber 70. This may be achieved by providing, for example, quartz view ports 71 in the chamber 70.

In the schematic representation of the structure associated with the embodiment of applicant's invention illustrated on FIGURE 6, both the pumping light electromagnetic radiation 100 and the trigger light electromagnetic radiation 108 traverse the passageway 92 through wall portions of the laser cell 90. The spacing of the optical pumping electromagnetic radiation 100 from the center portion 93 of laser cell 90, from which the laser emission is obtained, is selected to provide that the moving particles in the secondary beam 86a' of optically orientable particles have sufficient time to be pumped up to the $P_{1/2}$ first optically excited state and decay back down to the $S_{1/2}$ ground state a sufficient number of times so that substantially all the particles are in the $F=2$, $m_f=+2$ magnetic substate before they are irradiated by the trigger light electromagnetic radiation 108.

In the preferred embodiment, the trigger light electromagnetic radiation irradiates the secondary beam 86a' throughout the center portion 93. As shown on FIGURE 7 which illustrates the laser cell 90, the trigger light electromagnetic radiation 108 passes through side wall portions 120 and 122 of center portion 93 of laser cell 90. These portions are not provided with a reflective coating. However, flat, parallel wall portions 124 and 126 have internal surfaces 124a and 126a, respectively, coated with a reflective coating 128 which may be similar to the reflective coating 54 of FIGURE 5, and reflect electromagnetic radiation across the passageway 92 therebetween as illustrated by the arrow 130. In this embodiment, the reflective surface 128a is partially transparent to the wavelength of electromagnetic radiation contained in the laser emission 118 which passes therethrough. Since the laser emission 118 is at substantially right angles to the direction of the velocity vector of the selected secondary beam 86a' thereby substantially eliminating Doppler bandwidth broadening as described above.

Figure 7:
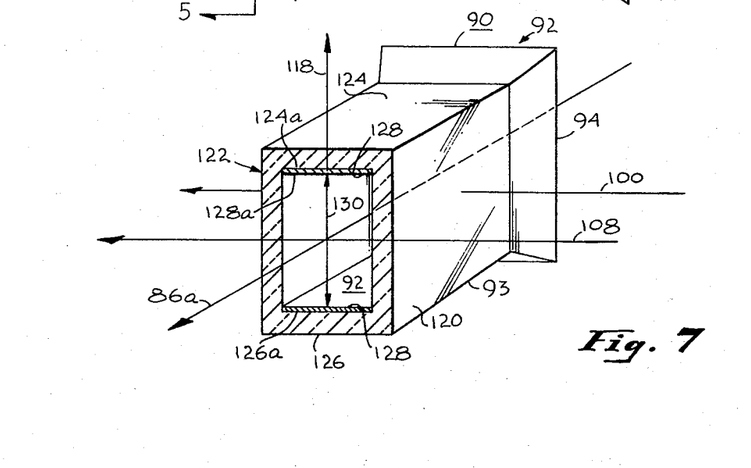
FIGURE 7 is a perspective sectional view of another laser cell.

As shown on FIGURE 7, the laser cell 90 is rectangular in cross-section and may be fabricated, for example, of quartz or any other similar material.

From the above description of the embodiments of applicant's invention illustrated in schematic form on FIGURES 2 and 6, it can be seen that only some of the optically orientable particles originally contained in the beam of optically orientable particles is utilized in the generation of the laser emission. Applicant has also found, according to the principles of his invention herein, that virtually all of the beam of optically orientable particles may be utilized to provide the desired laser emission.

Figure 8:
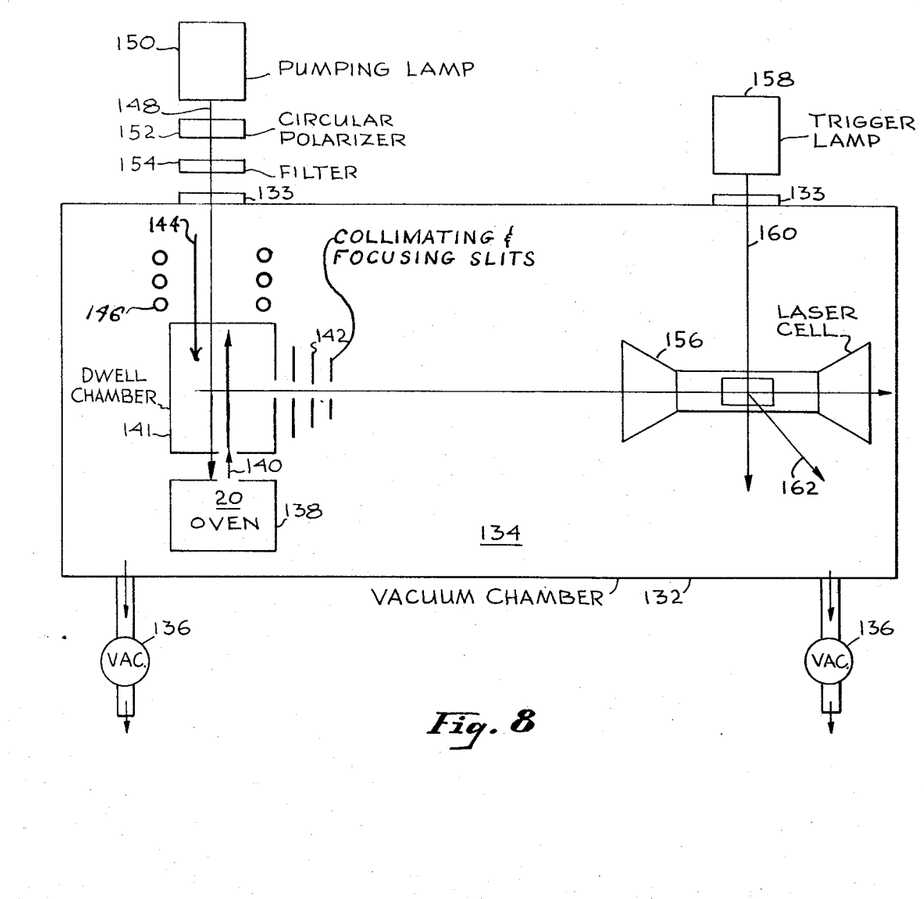
FIGURE 8 is a schematic representation of another embodiment of applicant's invention.

An embodiment of applicant's invention utilizing virtually all of the particles comprising a beam of optically orientable particles in the laser emission is illustrated in schematic form on FIGURE 8. The structure illustrated schematically on FIGURE 8 comprises a vacuum chamber 132 which may be similar to the chamber 10 of FIGURE 2, and the interior 134 of which is maintained at a preselected pressure by vacuum pumps 136 which may be similar to the vacuum pumps 14 of FIGURE 2. Contained within the interior portion 136 is a means for generating a beam of optically orientable particles such as the oven 138 which may be similar to the oven 18 illustrated on FIGURE 2.

Contained within the oven 138 is an optically orientable medium 20 which, for purposes of illustration, may be sodium. Thus, the oven 138 is adapted to emit a beam of optically orientable particles 140 comprising a plurality of sodium atoms. The beam of optically orientable particles 140 enters a dwell chamber 141 that is transparent to preselected wavelengths of electromagnetic radiation. The dwell chamber 141 is provided to accumulate the beam of optically orientable particles 140 and permit sufficient time therein for the particles to be acted upon by optical pumping electromagnetic radiation. The walls of dwell chamber 141 may be coated with eicosane, Dri-Film, paraffin, or the like, to aid in the orientation of the particles induced by optical pumping. The optically orientable particles in dwell chamber 141 are subjected to a weak, unidirectional, uniform magnetic field illustrated by the arrow 144 generated by coil means 146. The coil means may be powered by any desired source of electrical energy (not shown). The unidirectional uniform magnetic field 144 induces Zeeman splitting in the optically orientable particles and splits the particles into the various magnetic substates of the $F=1$ and $F=2$ levels of the $S_{1/2}$ ground state.

After the optically orientable particles are split into the various magnetic substates within dwell chamber 141, they are irradiated by optical pumping electromagnetic radiation 148 generated by an optical pumping lamp 150. The optical pumping lamp 150 may be similar to the optical pumping lamp 98 illustrated on FIGURE 6 and may, when sodium is utilized as the optically orientable medium 20, comprise a sodium vapor lamp. The optical pumping electromagnetic radiation 148 is circularly polarized by circular polarizer 152 and then may be filtered, if desired, by filter means 154 to eliminate undesired wavelengths contained within the optical pumping light beam 148.

As the optical pumping light beam 148 irradiates the optically orientable particles, energy transitions are induced therein up to the $P_{1/2}$ first optically excited state, and in these energy transitions the individual optically orientable particles undergo a gain of one magnetic substate number. Thus, virtually all the particles are ultimately pumped into the $m_f=+2$ magnetic substate of the $F=2$ level of the $S_{1/2}$ ground state after spontaneous decays from the $P_{1/2}$ first optically excited state.

The optical pumping electromagnetic radiation 148 may continually irradiate particles, as this does not interfere with operation of applicant's invention.

The particles leave dwell chamber 141 and are substantially concentrated in the $m_f=2$ magnetic substate of the $F=2$ level of the $S_{1/2}$ ground state and pass through collimating and focusing slits 142 before entering laser cell 156. Laser cell 156 may be similar to either laser cell 38 illustrated in FIGURES 3, 4 and 5 or laser cell 90 illustrated in FIGURE 7.

A trigger light lamp 158 is positioned to irradiate the particles contained within the laser cell 156 with a beam of trigger light electromagnetic radiation 160. The trigger light electromagnetic radiation 160 is preferably intense to provide the above-described sudden quantum energy transitions. The trigger light electromagnetic radiation 160 has energy in a wavelength equivalent to the energy separation indicated on FIGURE 1c to induce the transitions up to the $P_{1/2}$ and $P_{3/2}$ optically excited states. Thus, the trigger light generator 158 may comprise a sodium lamp similar to the trigger light generators 58 of FIGURE 2 and 106 of FIGURE 6.

This irradiation induces the laser action within the laser cell 156 in a manner similar to that described above in connection with the embodiments of applicant's invention illustrated on FIGURES 2 and 6 and provides laser emission 162 therefrom.

Therefore, it can be seen that applicant has an improved laser in which the structure and method of operation permits the utilization of a variety of optically orientable materials to provide a source of laser emission. The wide variety of optically orientable materials that may be utilized with this improved structure and method of operation thus allows laser emission wavelengths in a continuous coherent beam of electromagnetic radiation in a variety of wavelengths throughout the near and far ultraviolet, visible and infrared portions of the electromagnetic radiation spectrum. Further, applicant's invention herein permits the construction of a laser that is more economical to fabricate and operate than lasers previously known.

Those skilled in the art will find many adaptations and variations of applicant's invention. Therefore, the appended claims are intended to cover all such variations and adaptations falling within the true scope and spirit of this invention.

I claim:
1. In combination:
   means for generating a continuous beam of optically orientable particles having a plurality of allowable quantum energy levels and having a preselected velocity in a first direction;
   means for optically inducing preselected quantum energy transitions in said beam of optically orientable particles to provide at least a first portion of said beam of optically orientable particles comprised of particles having energy substantially concentrated in one of said plurality of allowable quantum energy levels; and
   means for continuously extracting in a second direction different from said first direction a coherent beam of electromagnetic radiation from said first portion of beam of optically orientable particles, said coherent beam of electromagnetic radiation having energy in at least one preselected wavelength of electromagnetic radiation corresponding to a quantum energy separation between a first and a second of said plurality of allowable quantum energy levels.

2. In combination:
   means for generating a continuous beam of optically orientable particles having energy substantially concentrated in one of a plurality of allowable quantum energy levels;

means for establishing a population inversion of the particles in said beam of optically orientable particles at a first of said plurality of allowable quantum energy levels with respect to a second of said plurality of allowable quantum energy levels lower than said first of said allowable quantum energy level; and means for continuously extracting a coherent beam of electromagnetic radiation from said continuous beam of optically orientable particles and having energy in at least one preselected wavelength of electromagnetic radiation corresponding to a quantum energy separation between said first and said second of said plurality of allowable quantum energy levels.

3. In combination:

means for generating a continuous beam of optically orientable particles having energy substantially concentrated in one of a plurality of allowable quantum energy levels;

means for optically establishing a population inversion of the particles in said beam of optically orientable particles at a first of said plurality of allowable quantum energy levels with respect to a second of said plurality of allowable quantum energy levels lower than said first of said plurality of allowable quantum energy level; and means for continuously extracting a coherent beam of electromagnetic radiation from said continuous beam of optically orientable particles having energy in at least one preselected wavelength of electromagnetic radiation corresponding to a quantum energy separation between said first and said second of said plurality of allowable quantum energy levels.

4. In combination:

means for generating a continuous beam of optically orientable particles having energy substantially concentrated in one of a plurality of allowable quantum energy levels and having a preselected velocity in a first direction;

means for optically establishing a population inversion of the particles in said beam of optically orientable particles at a first of said plurality of allowable quantum energy levels with respect to a second of said plurality of allowable quantum energy levels lower than said first of said plurality of allowable quantum energy level; and means for continuously extracting in a second direction different from said first direction a coherent beam of electromagnetic radiation from said beam of optically orientable particles, and having energy in at least one preselected wavelength of electromagnetic radiation corresponding to a quantum energy separation between said first and said second of said plurality of allowable quantum energy levels.

5. In combination:

means for generating a continuous beam of optically orientable particles having a plurality of allowable quantum energy levels and having a preselected velocity in a first direction;

means for splitting said beam of optically orientable particles into a plurality of secondary beams and at least a first of said secondary beams susbtantially homogeneous in optically orientable particles at a preselected quantum energy level;

means for optically inducing preselected quantum energy transitions of the particles in said first of said plurality of secondary beams; and means for continuously extracting a coherent beam of electromagnetic radiation in a second direction substantially perpendicular to said first direction from said first of said plurality of secondary beams, said coherent beam of electromagnetic radiation having energy in a wavelength corresponding to the quantum energy separation between a pair of said plurality of allowable quantum energy state levels.

6. A laser cell of the type adapted to generate a continuous laser beam comprising in combination:

a tube-like body member having walls defining a passageway therethrough, said walls transparent to preselected wavelengths of electromagnetic radiation and said passageway having an axis in a first direction; and a pair of spaced-apart substantially parallel reflecting members on opposite sides of said passageway and each of said reflecting members having a surface parallel to said first direction and each of said surfaces reflective of at least one wavelength of electromagnetic radiation of said preselected wavelength therebetween across said passageway in a second direction substantially perpendicular to said first direction, and one of said reflecting members at least partially transparent to said at least one wavelength of electromagnetic radiation for transmission therethrough in said second direction.

7. A laser cell of the type adapted to generate a continuous laser beam comprising in combination:

a tube-like body member having walls defining a passageway therethrough, said walls transparent to preselected wavelengths of electromagnetic radiation and said passageway having an axis in a first direction; and a pair of spaced-apart substantially parallel reflecting members coupled to said body member on opposite sides of said passageway and each of said reflecting members having an internal surface parallel to said first direction and each of said internal surfaces having a reflective coating thereon for reflecting at least one wavelength of electromagnetic radiation of said preselected wavelength therebetween across said passageway in a second direction substantially perpendicular to said first direction, and said reflective coating on one of said internal surfaces partially transparent to said at least one wavelength of electromagnetic radiation for transmission therethrough to regions exterior said passageway in said second direction.

8. A continuous wave laser comprising in combination:

means for generating a beam of optically orientable particles having a plurality of allowable quantum energy levels;

means for orienting a first part of said beam of optically orientable particles into a first of said plurality of allowable quantum energy levels;

a laser cell comprising a body member having walls defining a passageway therethrough positioned to receive said first part of said beam of optically orientable particles in said passageway and transmit said first part of said beam of optically orientable particles through said passageway;

a pair of spaced-apart substantially flat, parallel, oppositely-disposed members on opposite sides of said passageway and spaced a preselected distance apart, each of said pair of members having at least one surface reflective of at least one preselected wavelength of electromagnetic radiation for reflecting said electromagnetic radiation therebetween across said passageway, and one of said pair of members partially transparent to said preselected wavelength of electromagnetic radiation;

a trigger lamp for generating an intense beam of trigger light electromagnetic radiation and positioned to irradiate said first part of said beam of optically orientable particles in said passageway for inducing a quantum energy transition in said particles between said first preselected allowable quantum energy level and a second preselected quantum energy level higher than said first preselected quantum energy level to induce an overpopulation of said second preselected allowable quantum energy level with respect to a third preselected allowable quantum energy level lower than said first preselected allowable quantum energy level; and means for inducing stimulated energy transitions of said first part of said beam of optically orientable particles from said second preselected quantum energy level to said third preselected quantum energy level whereby electromagnetic radiation having energy in said preselected wavelength is emitted therefrom, reflected between said members and a part of said emitted electromagnetic radiation is transmitted through said partially transparent member.

9. A continuous wave laser comprising in combination:

means for generating a beam of optically orientable particles having a plurality of allowable quantum energy levels;

means for splitting said beam of optically orientable particles into a first part and a second part, said first part substantially homogeneous in optically orientable particles in a first preselected allowable quantum energy level;

a laser cell comprising a body member having walls defining a passageway therethrough positioned to receive said first part of said beam of optically orientable particles in said passageway and transmit said first part of said beam of optically orientable particles through said passageway;

a pair of spaced-apart, oppositely-disposed members on opposite sides of said passageway and spaced a preselected distance apart, each of said pair of members having at least one surface reflective of at least one preselected wavelength of electromagnetic radiation for reflecting said electromagnetic radiation therebetween across said passageway, and one of said pair of members partially transparent to said preselected wavelength of electromagnetic radiation;

a trigger lamp for generating an intense beam of trigger light electromagnetic radiation and positioned to irradiate said first part of said beam of optically orientable particles in said passageway for inducing a quantum energy transition in said particles between said first preselected allowable quantum energy level and a second preselected quantum energy level higher than said first preselected quantum energy level to induce an overpopulation of said second preselected allowable quantum energy level with respect to a third preselected allowable quantum energy level lower than said first preselected allowable quantum energy level; and means for inducing stimulated energy transitions of said first part of said beam of optically orientable particles from said second preselected quantum energy level to said third preselected quantum energy level whereby electromagnetic radiation having energy in said preselected wavelength is emitted therefrom and reflected between said members and a part of said emitted electromagnetic radiation is transmitted through said partially transparent member.

10. A continuous wave laser comprising in combination:

means for generating a beam of optically orientable particles having a plurality of allowable quantum energy levels;

magnetic field generator for generating a strong unidirectional magnetic field gradient in regions containing said beam of optically orientable particles to split said beam of optically orientable particles into a plurality of secondary beams, and a first of said secondary beams being substantially homogeneous in optically orientable particles having energy in a first of said plurality of allowable quantum energy levels;

a laser cell comprising:

a tube-like body member having walls defining a passageway therethrough, said walls transparent to preselected wavelengths of electromagnetic radiation and said passageway having an axis in a first direction;

a pair of spaced-apart reflecting members coupled to said body member on opposite sides of said passageway and each of said reflecting members having an internal surface parallel to said first direction and each of said internal surfaces having a reflective coating thereon for reflecting at least one wavelength of electromagnetic radiation of said preselected wavelength therebetween across said passageway in a second direction substantially perpendicular to said first direction, and one of said internal surfaces partially transparent to said at least one wavelength of electromagnetic radiation for transmission therethrough in said second direction, and said laser cell positioned to receive said first of said secondary beam of optically orientable particles for transmission through said passageway; and a trigger lamp for generating an intense beam of trigger light electromagnetic radiation and positioned to irradiate said first of said secondary beams of optically orientable particles in said passageway for inducing preselected quantum energy transitions therein to induce the emission therefrom of a coherent beam of electromagnetic radiation and at least a part of said coherent beam of electromagnetic radiation being transmitted through said partially transparent reflective member.

11. A continuous wave laser comprising in combination:

means for generating a beam of optically orientable particles having a plurality of allowable quantum energy levels, and having a velocity in a first preselected direction;

a magnetic field generator for generating a strong unidirectional magnetic field gradient in regions containing said beam of optically orientable particles to split said beam of optically orientable particles into a plurality of secondary beams, and a first of said secondary beams being substantially homogeneous in optically orientable particles having energy in a first of said plurality of allowable quantum energy levels, and said magnetic field gradient in a said direction substantially perpendicular to said first direction;

a laser cell comprising:

a tube-like body member having walls defining a passageway therethrough, said walls transparent to preselected wavelengths of electromagnetic radiation and said passageway having an axis in a third direction;

a pair of spaced-apart reflecting members coupled to said body member on opposite sides of said passageway and each of said reflecting members having an internal surface parallel to said third direction and each of said internal surfaces having a reflective coating thereon for reflecting at least one wavelength of electromagnetic radiation of said preselected wavelength therebetween across said passageway in a fourth direction substantially perpendicular to said third direction, and one of said internal surfaces partially transparent to said at least one wavelength of electromagnetic radiation for transmission therethrough in said fourth direction and said laser cell positioned to receive said first of said secondary beams of optically orientable particles for transmission through said passageway in said third direction; and a trigger lamp for generating an intense beam of trigger light electromagnetic radiation and positioned to irradiate said first of said secondary beams of optically orientable particles in a fifth direction substantially perpendicular to said third direction in said passageway for inducing preselected quantum energy transitions therein to induce the emission therefrom of a coherent beam of electromagnetic radiation and at least a part of said coherent beam of electromagnetic radiation being transmitted through said partially transparent reflective member for transmission therethrough in said fourth direction and substantially perpendicular to said third direction.

12. A continuous wave laser comprising in combination:

source means for generating a beam of optically orientable particles having a plurality of allowable quantum energy levels, and said beam of optically orientable particles having a velocity in a first preselected direction;

a magnetic field generator for generating a strong unidirectional magnetic field gradient in regions containing said beam of optically orientable particles to split said beam of optically orientable particles into a plurality of secondary beams, and a first of said secondary beams being substantially homogeneous in optically orientable particles having energy in a first of said plurality of allowable quantum energy levels, and said gradient in a second direction substantially perpendicular to said first direction;

first collimating and focusing means intermediate said source means and said magnetic field generator for collimating and focusing said beam of optically orientable particles in said first direction;

a laser cell comprising:

a tube-like body member having walls defining a passageway therethrough, said walls transparent to preselected wavelengths of electromagnetic radiation and said passageway having an axis in a third direction;

a pair of spaced-apart substantially parallel reflecting members coupled to said body member on opposite sides of said passageway and each of said reflecting members having an internal surface parallel to said third direction and each of said internal surfaces having a reflective coating thereon for reflecting at least one wavelength of electromagnetic radiation of said preselected wavelength therebetween across said passageway in a fourth direction substantially perpendicular to said third direction, and one of said internal surfaces partially transparent to said at least one wavelength of electromagnetic radiation for transmission therethrough in said fourth direction, and said laser cell positioned to receive said first of said secondary beams of optically orientable particles for transmission through said passageway in said third direction;

second collimating and focusing means intermediate said magnetic field generator and said laser cell for collimating and focusing said first of said secondary beams in said third direction;

means for maintaining said optically orientable particles in said passageway at a preselected pressure;

a trigger lamp for generating an intense beam of trigger light electromagnetic radiation and positioned to irradiate said first of said secondary beams of optically orientable particles in a fifth direction substantially perpendicular to said third direction in said passageway for inducing preselected quantum energy transitions therein to induce the emission therefrom of a coherent beam of electromagnetic radiation and at least a part of said coherent beam of electromagnetic radiation being transmitted through said partially transparent reflective member for transmission therethrough in said fourth direction substantially perpendicular to said third direction; and means for filtering said beam of trigger light electromagnetic radiation.

13. A continuous wave laser comprising in combination:

means for generating a beam of optically orientable particles having a plurality of allowable quantum energy levels;

beam splitting means for splitting said beam of optically orientable particles into a first part and a second part, said first part substantially homogeneous in optically orientable particles in a first preselected allowable quantum energy level;

a laser cell comprising a body member having walls defining a passageway therethrough positioned to receive said first part of said beam of optically orientable particles in said passageway and transmit said first part of said beam of optically orientable particles through said passageway;

a pair of spaced-apart, substantially flat, parallel, oppositely-disposed members on opposite sides of said passageway and spaced a preselected distance apart, each of said pair of members having at least one surface reflective of at least one preselected wavelength of electromagnetic radiation for reflecting said electromagnetic radiation therebetween across said passageway, and one of said pair of members partially transparent to said preselected wavelength of electromagnetic radiation;

a trigger lamp for generating an intense beam of trigger light electromagnetic radiation and positioned to irradiate said first part of said beam of optically orientable particles in said passageway for inducing a first quantum energy transition in said particles between said first preselected allowable quantum energy level and a second preselected quantum energy level higher than said first preselected allowable quantum energy level with respect to a third preselected allowable quantum energy level lower than said first preselected allowable quantum energy level;

means for inducing stimulated energy transitions of said first part of said beam of quantum of optically orientable particles from said second preselected quantum energy level to said third preselected quantum energy level whereby electromagnetic radiation having energy in said preselected wavelength is emitted therefrom and a part of said emitted electromagnetic radiation is transmitted through said partially transparent member; and means intermediate said beam splitting means and said laser cell for irradiating said first of said secondary beams with circularly polarized optical pumping electromagnetic radiation to induce second preselected quantum energy transitions of said optically orientable particles in said first of said plurality of said secondary beams.

14. A continuous wave laser comprising in combination:

means for generating a beam of optically orientable particles having a plurality of allowable quantum energy levels;

a magnetic field generator for generating a strong unidirectional magnetic field gradient in regions containing said beam of optically orientable particles to split said beam of optically orientable particles into a plurality of secondary beams, and a first of said secondary beams being substantially homogeneous in optically orientable particles having energy in a first of said plurality of allowable quantum energy levels;

a laser cell comprising:

a tube-like body member having walls defining a passageway therethrough, said walls transparent to preselected wavelengths of electromagnetic radiation and said passageway having an axis in a first direction;

a pair of spaced-apart, substantially parallel, reflecting members coupled to said body member on opposite sides of said passageway and each of said reflecting members having an internal surface parallel to said first direction and each of said internal surfaces having a reflective coating thereon for reflecting at least one wavelength of electromagnetic radiation of said preselected wavelengths therebetween across said passageway in a second direction substantially perpendicular to said first direction, and one of said internal surfaces partially transparent to said at least one wavelength of electromagnetic radiation for transmission therethrough in said second direction, and said laser cell positioned to receive said first of said secondary beams of optically orientable particles for transmission through said passageway;

a trigger lamp for generating an intense beam of trigger light electromagnetic radiation and positioned to irradiate said first of said secondary beams of optically orientable particles in said passageway for inducing first preselected quantum energy transitions therein to induce the emission therefrom of a coherent beam of electromagnetic radiation and at least a part of said coherent beam of electromagnetic radiation being transmitted through said partially transparent reflective member; and means intermediate said magnetic field generator and said trigger lamp for irradiating said first of said secondary beams with circularly polarized optical pumping electromagnetic radiation to induce second preselected quantum energy transitions of said optically orientable particles in said first of said plurality of said secondary beams.

15. A continuous wave laser comprising in combination:

means for generating a beam of optically orientable particles having a plurality of allowable quantum energy levels, and having a velocity in a first preselected direction;

a magnetic field generator for generating a strong unidirectional magnetic field gradient in regions containing said beam of optically orientable particles to split said beam of optically orientable particles into a plurality of secondary beams, and a first of said secondary beams being substantially homogenerous in optically orientable particles having energy in a first of said plurality of allowable quantum energy levels, and said magnetic field gradient being in a second direction substantially perpendicular to said first direction;

a laser cell comprising:

a tube-like body member having walls defining a passageway therethrough, said walls transparent to preselected wavelengths of electromagnetic radiation and said passageway having an axis in a third direction;

a pair of spaced-apart, substantially parallel, reflecting members coupled to said body member on opposite sides of said passageway and each of said reflecting members having an internal surface parallel to said third direction and each of said internal surfaces having a reflective coating thereon for reflecting at least one wavelength of electromagnetic radiation of said preselected wavelengths therebetween across said passageway in a fourth direction substantially perpendicular to said third direction, and one of said internal surfaces partially transparent to said at least one wavelength of electromagnetic radiation for transmission therethrough in said fourth direction, and said laser cell positioned to receive said first of said secondary beams of optically orientable particles for transmission through said passageway in said third direction;

a trigger lamp for generating an intense beam of trigger light electromagnetic radiation and positioned to irradiate said first of said secondary beams of optically orientable particles in a fifth direction substantially perpendicular to said third direction in said passageway for inducing first preselected quantum energy transitions therein to induce the emission therefrom of a coherent beam of electromagnetic radiation and at least a part of said coherent beam of electromagnetic radiation being transmitted through said partially transparent reflective member for transmission therethrough in a third direction substantially perpendicular to said first direction; and means intermediate said magnetic field generator and said laser cell for irradiating said first of said secondary beams with circularly polarized optical pumping electromagnetic radiation to induce second preselected quantum energy transitions of said optically orientable particles in said first plurality of said secondary beams.

16. A continuous wave laser comprising in combination:

source means for generating a beam of optically orientable particles having a plurality of allowable quantum energy levels, and having a velocity in a first preselected direction;

a magnetic field generator for generating a strong unidirectional magnetic field gradient in regions containing said beam of optically orientable particles to split said beam of optically orientable particles into a plurality of secondary beams, and a first of said secondary beams being substantially homogeneous in optically orientable particles having energy in a first of said plurality of allowable quantum energy levels, and said magnetic field gradient being in a second direction substantially perpendicular to said first direction;

first collimating and focusing means intermediate said source means and said magnetic field generator for collimating and focusing said beam of optically orientable particles in said first direction;

a laser cell comprising:

a tube-like body member having walls defining a passageway therethrough, said walls transparent to preselected wavelengths of electromagnetic radiation and said passageway having an axis in a third direction;

a pair of spaced-apart, substantially parallel, reflecting members coupled to said body member on opposite sides of said passageway and each of said reflecting members having an internal surface parallel to said third direction and each of said internal surfaces having a reflective coating thereon for reflecting at least one wavelength of electromagnetic radiation of said preselected wavelengths therebetween across said passageway in a fourth direction substantially perpendicular to said third direction, and one of said reflective coatings on one of said internal surfaces partially transparent to said at least one wavelength of electromagnetic radiation for transmission therethrough in said fourth direction, and said laser cell positioned to receive said first of said secondary beams of optically orientable particles for transmission through said passageway in said third direction;

second collimating and focusing means intermediate said magnetic field generator and said laser cell for collimating and focusing said first of said plurality of secondary beams in said third direction;

means for maintaining said optically orientable particles in said passageway at a preselected pressure;

a trigger lamp for generating an intense beam of trigger light electromagnetic radiation and positioned to irradiate said first of said secondary beams of optically orientable particles in said passageway for inducing preselected quantum energy transitions therein to induce the emission therefrom of a coherent beam of electromagnetic radiation and at least a part of said coherent beam of electromagnetic radiation being transmitted through said partially transparent reflective coating on one of said members for transmission therethrough in said fourth direction substantially perpendicular to said third direction;

means for filtering said beam of trigger light electromagnetic radiation;

optical pumping lamp for generating a beam of optical pumping electromagnetic radiation;

means for circularly polarizing said optical pumping electromagnetic radiation;

filter means for filtering said optical pumping electromagnetic radiation; and means intermediate said magnetic field generator and said laser cell for irradiating said first of said plurality of secondary beams of optically orientable particles with said circularly polarized and filtered optical pumping electromagnetic radiation to induce preselected quantum energy transitions of said optically orientable particles.

17. A continuous wave laser comprising in combination:

source means for generating a beam of optically orientable particles having a plurality of allowable quantum energy levels;

a laser cell comprising:
  a tube-like body member having walls defining a passageway therethrough, said walls transparent to preselected wavelengths of electromagnetic radiation and said passageway having an axis in a first direction;
  a pair of spaced apart substantially parallel reflecting members coupled to said body member on opposite sides of said passageway and each of said reflecting members having an internal surface parallel to said first direction and each of said internal surfaces having a reflective coating thereon for reflecting at least one wavelength of electromagnetic radiation of said preselected wavelength therebetween across said passageway in a second direction substantially perpendicular to said first direction, and one of said internal surfaces partially transparent to said at least one wavelength of electromagnetic radiation for transmission therethrough in said second direction, and said laser cell positioned to receive said beam of optically orientable particles for transmission through said passageway;

a trigger lamp for generating an intense beam of trigger light electromagnetic radiation and positioned to irradiate said beam of optically orientable particles in said passageway for inducing first preselected quantum energy transitions therein to induce the emission therefrom of a coherent beam of electromagnetic radiation and at least a part of said coherent beam of electromagnetic radiation being transmitted through said partially transparent reflective member;

means for irradiating said optically orientable particles in said source means with circularly polarized optical pumping electromagnetic radiation to provide substantially all of said particles in said beam of optically orientable particles at a preselected quantum energy level of said allowable quantum energy levels; and means for generating a weak, unidirectional uniform magnetic field in regions containing said.

18. A continuous wave laser comprising in combination:

source means for generating a beam of optically orientable particles having a plurality of allowable quantum energy levels, and having a velocity in a first preselected direction;

a laser cell comprising:
  a tube-like body member having walls defining a passageway therethrough, said walls transparent to preselected wavelengths of electromagnetic radiation and said passageway having an axis in said first direction;
  a pair of spaced-apart substantially parallel reflecting members coupled to said body member on opposite sides of said passageway and each of said reflecting members having an internal surface parallel to said first direction and each of said internal surfaces having a reflective coating thereon for reflecting at least one wavelength of electromagnetic radiation of said preselected wavelength therebetween across said passageway in a second direction substantially perpendicular to said first direction, and said coating on one of said internal surfaces partially transparent to said at least one wavelength of electromagnetic radiation for transmission therethrough in said second direction, and said laser cell positioned to receive said beam of optically orientable particles for transmission through said passageway in said first direction;

a trigger lamp for generating an intense beam of trigger light electromagnetic radiation and positioned to irradiate said beam of optically orientable particles in said passageway for inducing first preselected quantum energy transitions therein to induce the emission therefrom of a coherent beam of electromagnetic radiation and at least a part of said coherent beam of electromagnetic radiation being transmitted through said partially transparent reflective member for transmission therethrough in a third direction substantially perpendicular to said first direction;

optical pumping lamp means for irradiating said beam of optically orientable particles in said source means with circularly polarized optical pumping electromagnetic radiation to provide optically orientable particles in said beam of optically orientable particles all having energy substantially concentrated in a preselected quantum energy level of said allowable quantum energy levels; and means for generating a weak, unidirectional uniform magnetic field in regions containing said source means.

19. A continuous wave laser comprising in combination:

source means for generating a beam of optically orientable particles having a plurality of allowable quantum energy levels, and having a velocity in a first preselected direction;

a laser cell comprising:
  a tube-like body member having walls defining a passageway therethrough, said walls transparent to preselected wavelengths of electromagnetic radiation and said passageway having an axis in said first direction;
  a pair of spaced-apart substantially parallel reflecting members coupled to said body member on opposite sides of said passageway and each of said reflecting members having an internal surface parallel to said first direction and each of said internal surfaces having a reflective coating thereon for reflecting at least one wavelength of electromagnetic radiation of said preselected wavelength therebetween across said passageway in a second direction substantially perpendicular to said first direction, and one of said coatings on one of said internal surfaces partially transparent to said at least one wavelength of electromagnetic radiation for transmission therethrough in said second direction, and said laser cell positioned to receive said beam of optically orientable particles for transmission through said passageway in said first direction;
a trigger lamp for generating an intense beam of trigger light electromagnetic radiation and positioned to irradiate said first of said secondary beam of optically orientable particles in said passageway for inducting first preselected quantum energy transitions therein to induce the emission therefrom of a coherent beam of electromagnetic radiation and at least a part of said coherent beam of electromagnetic radiation being transmitted through said partially transparent reflective coating on one of said members for transmission therethrough in said second direction substantially perpendicular to said first direction;
collimaitng and focusing means intermediate said source means and said laser cell for collimating and focusing said beam of optically orientable particles;
means for maintaining said optically orientable particles in said passageway at a preselected pressure;
means for filtering said beam of trigger light electromagnetic radiation;
optical pumping lamp for generating a beam of optical pumping electromagnetic radiation;
means for circularly polarizing said optical pumping electromagnetic radiation;
filter means for filtering said optical pumping electromagnetic radiation; and
means for irradiating said optically orientable particles in said source means with said circularly polarized and filtered optical pumping electromagnetic radiation to provide particles in said beam of optically orientable particles having their energy substantially concentrated in a predetermined quantum energy level of said allowable quantum energy level; and
means for generating a weak, unidirectional uniform magnetic field in regions containing said source means.

20. A method of operating a continuous wave laser comprising the steps of:
generating a beam of optically orientable particles having a plurality of allowable quantum energy levels;
inducing quantum energy transitions in said beam of optically orientable particles to establish at least a first part of said beam in a substantially homogeneous condition of optically orientable particles in a preselected energy level;
irradiating said first part of said beam of optically orientable particles with intense trigger light electromagnetic radiation to induce a population inversion of said particles in a second preselected quantum energy state higher than said first preselected quantum energy level; and
inducing stimulated transitions of said particles from said second quantum energy level to a third quantum energy level lower than said first quantum energy level.

21. A method of operating a continuous wave laser comprising the steps of:
generating a beam of optically orientable particles;
splitting said beam of optically orientable particles into a plurality of secondary beams;
establishing a preselected quantum energy level condition in a first of said plurality of secondary beams; and
continuously irradiating said first of said plurality of secondary beams with intense trigger light electromagnetic radiation to induce the emission of a coherent beam of electromagnetic radiation from said first of said secondary beams of optically orientable particles.

22. A method of operating a continuous wave laser comprising the steps of:
continuously generating a beam of optically orientable particles having a plurality of allowable quantum energy levels;
splitting said beam of optically orientable particles into a plurality of secondary beams of optically orientable particles;
continually irradiating a first of said plurality of secondary beams with circularly polarized optical pumping electromagnetic radiation to establish a preselected quantum energy level of said particles in said first of said plurality of secondary beams;
transmitting said first of said plurality of secondary beams of optically orientable particles through a laser cell; and
continuously irradiating said beam of optically orientable particles in said laser cell with an intense trigger light electromagnetic radiation to induce the emission from said beam of optically orientable particles of a continuous beam of electromagnetic radiation.

References Cited
UNITED STATES PATENTS
2,851,652 9/1958 Dicke.
3,191,157 6/1965 Parker et al. _____________ 88—1

OTHER REFERENCES
Kastler: "Optical Methods of Atomic Orientation and of Magnetic Resonance," J.O.A.S., vol. 47, No. 6, pp. 460–465, June 1957, QC 350 06.

Kleppner et al.: "Properties of the Hydrogen Maser," Applied Optics, vol. 1, No. 1, pp. 55–60, January 1962, QC 350 A5.

Rabinowitz et al.: "Continuous Optically Pumped Cs Laser," Applied Optics, vol. 1, No. 4, pp. 513–516, July 1962, QC 350 A5.

JEWELL H. PEDERSEN, *Primary Examiner.*

E. BAUER, *Assistant Examiner.*